United States Patent [19]

Hayashi et al.

[11] 4,202,868

[45] May 13, 1980

[54] PRODUCTION OF HIGH-DENSITY CARBON MATERIALS

[75] Inventors: Kiyoshige Hayashi, Tokyo; Masanao Nakagawa, Ichihara; Kazuo Ozaki, Ichihara; Yoshiharu Ito, Ichihara, all of Japan

[73] Assignee: Maruzen Petrochemical Co., Ltd., Tokyo, Japan

[21] Appl. No.: 810,741

[22] Filed: Jun. 28, 1977

[30] Foreign Application Priority Data

Jul. 1, 1976 [JP] Japan .................................. 51-77010
Jul. 27, 1977 [JP] Japan .................................. 52-64881

[51] Int. Cl.$^2$ ...................... C01B 31/00; C01B 31/02; C01B 31/04
[52] U.S. Cl. .................................. 423/445; 423/448; 423/449
[58] Field of Search ............... 423/449, 450, 448, 445; 264/29.5, 29.1

[56] References Cited

U.S. PATENT DOCUMENTS

| | | | |
|---|---|---|---|
| 2,761,848 | 9/1956 | Bushong et al. ..................... | 423/449 |
| 3,084,394 | 4/1963 | Bickerdike et al. .................. | 423/449 |
| 3,442,715 | 5/1969 | Yee et al. ............................ | 264/29.1 |
| 3,565,980 | 2/1971 | Otani .................................... | 264/29.1 |
| 4,024,226 | 5/1977 | Lersmacher et al. ................ | 423/445 |
| 4,046,709 | 9/1977 | Yuki ..................................... | 423/445 |
| 4,059,682 | 11/1977 | Luhleich et al. .................... | 264/29.1 |
| 4,071,604 | 1/1978 | Schwemer .......................... | 423/445 |

FOREIGN PATENT DOCUMENTS

829209 3/1960 United Kingdom ..................... 423/449

*Primary Examiner*—O. R. Vertiz
*Assistant Examiner*—Gregory A. Heller
*Attorney, Agent, or Firm*—Larson, Taylor and Hinds

[57] ABSTRACT

In the production of high-density carbon materials directly from a green coke without the aid of a binder by a process comprising molding a finely pulverized green coke as such by pressing in a mold, demolding and baking the molded green coke to form a sintered carbon material and, if desired, graphitizing the sintered material, a serious disadvantage that there occur laminar cracks in the molded green coke at the demolding stage is avoided by molding the green coke in the form of a composition comprising a finely pulverized green coke in intimate admixture with a small amount of water or a certain monohydric alcohol.

11 Claims, No Drawings

PRODUCTION OF HIGH-DENSITY CARBON MATERIALS

BACKGROUND OF THE INVENTION

This invention relates to an improvement in or relating to a process for the production of high-density carbon materials directly from a green coke without the aid of a binder and to high-density carbon materials produced by such an improved process.

By the term "carbon materials" is meant both sintered and graphitized materials and the term "high-density" used with respect to the carbon materials means to have an apparent specific gravity of at least 1.75 when measured in graphitized form, the graphitization being effected at approximately 3000° C.

High-density carbon materials are of importance in industry mainly as materials of machinery, electrodes for electro-discharge machinings, nuclear reactors and some others. Recently, because of their high corrosion resistance and high strength, particularly at high temmperatures, high-density carbon materials are being directed to new applications as corrosion-resistant structural materials and high temperature-resistant materials, for example. Thus, marked increase in the output of such high-density carbon materials may be expected.

Hitherto, high-density carbon materials were produced by long-established processes typically comprising the steps of finely pulverizing a calcined coke, incorporating a binder pitch having a softening point of about 80°–110° C. in an amount of 25–33% by weight based on the weight of calcined coke by kneading under heating, molding the kneaded mass by pressing in a mold, rubber-pressing, extrusion, isostatic pressing and the like, baking the molded mass at a temperature near 1000° C. to form a carbonized mass having an apparent specific gravity of about 1.60–1.65, dipping under pressure the carbonized mass in a pitch melted at about 250° C. and diluted with coal tar to impregnate the mass with the pitch, rebaking the impregnated mass at a temperature near 1000° C. and repeating the pitch-impregnating and rebaking steps one or two times to obtain a carbon material having an apparent specific gravity of about 1.70–1.75 at most and, if desired, graphitizing the carbon material thus obtained at a temperature above 2800° C. to obtain a graphite material having an apparent specific gravity of 1.8 or higher.

The old processes as above-mentioned are disadvantageous in that they require many steps, thus being very time-consuming. For example, more than one month is required from the pulverizing of calcined coke to the finishing of the graphite material even for the production of a small-sized product and more than three months are necessary for a large-sized product. Inevitably, therefore, the high-density carbon materials hitherto produced are expensive and the lowering of the production cost thereof will be difficult and unexpectable.

Various attempts have been made to find an improved process for the production of high-density carbon materials. Thus, there has already been developed on an industrial scale a process wherein a molded mass comprising a finely pulverized calcined coke kneaded with a binder pitch as prepared according to the old processes is baked at 700°–900° C. under an elevated pressure of 50–100 atmospheres for carbonization with the intention of enhancing the carbonization yield of the binder pitch whereby to obtain a carbon material having an apparent specific gravity of 1.7 or higher and, if desired, the carbon material thus obtained is graphitized at a temperature above 2800° C. to yield a graphite material having an apparent specific gravity of 1.8 or higher. This process requires no pitch-impregnating and rebaking steps as required in the old processes, so that the time required can be reduced significantly. However, since the cost of high-pressure baking furnace is expensive both for construction and operation, this process is still unsatisfactory particularly from the economical point of view.

Recently, we have proposed a new type of process for the production of high-density carbon materials starting directly from a green coke, and not a calcined one. The new process comprises finely pulverizing a green coke containing a certain amount of volatile matters, molding the pulverized green coke as such, namely without the addition of a binder pitch, by pressing it in a mold and demolding and sintering the molded green coke at a sintering temperature to form a sintered carbon material and, if desired, graphitizing the sintered carbon material (see Japanese Patent Prepublication No. 150505/76 and Japanese Patent Application No. 155113/76). The formation of sintered carbon materials having a high apparent specific gravity and high mechanical strength from a green coke as such without the aid of a binder pitch is believed to result from such a so-called "self-sintering" phenomenon that firm carbon-carbon chemical bondings between coke particles are formed during the sintering where volatile matters contained in the green coke are decomposed and vaporized. It is expected that this process is available, in itself, as one of effectual processes for large scale production of carbon materials. However, this process has a serious disadvantage in that cracks are caused in the periphery of the molded green coke at the demolding stage which is effected by extrusion from the mold in which finely pulverized green coke has been molded by pressing. The cracks are mainly formed near the periphery of the molded green coke in perpendicular direction to the extrusion and in parallel with one another and are therefore so-called "lamination" or "laminar cracks". Hereinafter, we refer to such cracks as laminar cracks. We have found from our experience that laminar cracks are much more liable to be formed in larger-sized molds, making the production of homogeneous, larger-sized products difficult and, in some extreme cases, impossible. This disadvantage will be avoidable by the application of a mold release agent to the mold or by the use of a split mold, but the adoption of these means is apparently inadvisable because of low productivity, costliness of split mold and increase in the total production cost.

Our investigation was started on the assumption that the laminar cracks are caused by large friction between the coke particles and the inner wall of mold and with the intention of finding an effective antifriction aid to be incorporated in the powdered green coke. The first possibility for this purpose was to incorporate a small amount of a powdered solid lubricant into the powdered green coke. We firstly tried to incorporate a powdered graphite having a particle size below 200 mesh into a powdered green coke having a particle size below 10μ and found that the incorporation of about 3–5% by weight of the graphite was effective to a certain extent, but incomplete, on the prevention of laminar cracks and that the incorporation of more than 5% of the same resulted in a considerable decrease in the mechanical strength of sintered carbon materials derived therefrom. The incorporation of calcium stearate in an amount varying from 0.01 to 2% by weight based on the green coke was found to have little or no effect on the prevention of laminar cracks. The use of some other solid lubricants such as molybdenum disulfide and polycarbon monofluoride was also expected for this purpose, but was in fact inadvisable because of contamination of the resulting carbon materials with molybdenum and sulfur in the former case and of the generation of carbon fluoride or hydrogen fluoride gas during the baking stage in the latter case.

We then tried to examine the usefulness of a variety of liquid lubricants which would have no adverse effect on the sintering of green coke. As such liquid lubricants, we expected those to be useful which vaporize at such a slow rate that no appreciable cracks are formed in the molded green coke during the elevation of temperature up to about 400° C. above which the sintering of green coke will start. From this point of view, we selected xylene and kerosene as typical examples of aromatic and aliphatic hydrocarbon solvents, respectively, with which a powdered green coke is easily wettable. Contrary to our expectation, however, the incorporation of 1-10% by weight of xylene had only a little effect on the prevention of laminar cracks and that of the same percentages of kerosene had no effect thereon at all.

The next step of our investigation was directed to the use of alcohols as another class of liquid lubricants with which a powdered green coke is wettable. We found that of alcohols, some of monohydric alcohols and all of polyhydric alcohols have little or no appreciable effect on the prevention of laminar cracks, whereas some others of monohydric alcohols are effective as antifriction aid for the purpose in question. Concretely, the incorporation of 1-15% by weight of a monohydric alcohol containing at least 4 carbon atoms and being in liquid state at room temperatures, such as butyl, octyl and benzyl alcohols was found effective for substantially reducing the frictional resistance caused on demolding the molded green coke from the mold by extrusion, thus resulting in the production of the molded green coke free from laminar cracks.

Our investigation was further continued to try the incorporation of a small amount of water into a powdered green coke instead of the monohydric alcohols above-mentioned. In fact, we supposed that there is little or no possibility for successful incorporation of water in view of such negative factors of powdered green coke as non-swelling with water, hydrophobic property and insufficient sintering in the presence of water. Quite unexpectedly, we have now found that powdered green coke can be wetted with a small amount of water relatively easily and that the presence of a certain small amount of water in the form of an intimate homogeneous mixture with a finely pulverized green coke to be molded is markedly effective for preventing laminar cracks, thus making it possible to produce large-sized carbon materials free from laminar cracks and having a high specific gravity and high mechanical strength.

BRIEF SUMMARY OF THE INVENTION

Accordingly, it is an object of this invention to provide an improved process for the production of carbon materials, both in sintered and graphitized forms, which is capable of making good the defect of the above-mentioned process of powder molding and self-sintering type and which is thus particularly applicable to the production of larger-sized products.

It is another object of this invention to provide high-density carbon materials, both in sintered and graphitized forms, having any desired smaller and larger sizes and having satisfactorily high mechanical strength derived from such an improved process.

Other and related objects of this invention will become apparent to those skilled in the art from the following description of the invention.

According to one aspect of this invention, therefore, there is provided a process for the production of a high-density carbon material comprising the steps of molding by pressing in a mold a finely pulverized green coke as such, demolding and baking the molded green coke at a sintering temperature to form a sintered carbon material and, if desired, graphitizing the sintered carbon material, characterized in that the green coke to be molded is used in the form of a composition comprising a finely pulverized green coke in intimate admixture with 1-15% by weight based on the weight of the green coke of water or a monohydric alcohol containing at least 4 carbon atoms and being in liquid state at room temperatures, whereby to prevent or reduce laminar cracks caused in the molded green coke at the demolding step.

The amount of water or a monohydric alcohol indicated hereinafter as percent by weight is based on the weight of green coke used unless otherwise stated.

DETAILED DESCRIPTION OF THE INVENTION

The use of water is preferred to that of a monohydric alcohol in both technical and economical points of view for the purpose of this invention.

It is preferred that the amount of water or a monohydric alcohol to be incorporated into a powdered green coke is up to 10% by weight, because there occur some oozing of water or alcohol from the molded green coke and pressing-out of a portion of green coke composition from the mold if the amount is in excess of 10% by weight, although the prevention of laminar cracks at the demolding step is successful. Most preferably, the amount of water or a monohydric alcohol to be incorporated is in the range of 3-8% by weight.

As monohydric alcohol containing at least 4 carbon atoms and being in liquid state at room temperatures, an alkanol containing 4-8 carbon atoms such as butyl, hexyl and octyl alcohols and benzyl alcohol are preferred.

In the process of this invention, the green coke to be used as starting material may be any of those from petroleum origin and coal pitch containing a certain amount of volatile matters. In general, there may be used as green coke a coal pitch coke or a premium grade petroleum coke having a volatile matter content of 7-10%, preferably 8-10% by weight or a regular or lower grade petroleum coke having a volatile matter content of 8-20%, preferably 10-16% by weight. If the volatile matter content of green coke is too low, it becomes difficult or impossible to achieve the fine pulverization of green coke to a desired fine particle size, thus reducing the mechanical strength of the resulting carbon material to an unacceptable extent. On the other hand, if the volatile matter content is excessively high, there occur the deformation and/or expansion in the molded material derived therefrom during the sintering step. The regulation of the volatile matter content of green coke, if required, may be made, for example, by a steam-stripping wherein steam is passed through the green coke at a temperature of about 400°–500° C. for 10 minutes to 10 hours depending upon the volatile matter content of the starting green coke or by a solvent extraction wherein the starting green coke is extracted with an aromatic solvent, e.g. xylene, at the boiling point of the solvent used under atmospheric pressure or preferably in an autoclave at a temperature above 200° C. for a short period of time.

It is also important that the green coke to be molded according to this invention should be used in a finely pulverized form and in the form of a composition comprising such a powdered green coke in intimate admixture with a specified amount of water or a monohydric alcohol for the purpose of producing high-density carbon materials. Our experiments have shown that the powdered green coke to be molded is preferred to have a particle size as small as possible and to be nearly spherical in shape. In general, we prefer to use a powdered green coke which is substantially spherical in shape and which has an average particle diameter of less than $6\mu$ and a particle size of less than $10\mu$. By the term "average particle diameter" is meant that determined by aqueous phase sedimentation method using Andreasen pipette and by "particle size" is meant that more than 75% of the whole have particle diameters of less than the value indicated, the determination being made by electron microscopic analysis.

According to another aspect of this invention, we provide three alternative processes for the preparation of a green coke composition comprising a finely pulverized green coke in intimate admixture with 1–15% by weight of water or a monohydric alcohol containing at least 4 carbon atoms and being in liquid state at room temperatures, which is to be used directly in the molding step of the first aspect process of this invention.

The first process for the preparation of such a green coke composition, hereinafter referred to as "molding composition", comprises providing a finely pulverized green coke previously prepared, adding thereto 1–15% by weight of water or a monohydric alcohol above-specified and intimately admixing them until a homogeneous mixture is obtained.

The intimate admixing of a finely pulverized green coke with water in the first process may be achieved efficiently by attrition, namely by grinding them in an attritive manner which may usually be carried out in any grinding machine of attrition type, typically an automatic mortar, edge runner, attrition mill, ring roll mill and the like. It is rather surprising that water can be intimately admixed with a finely pulverized green coke relatively easily to form a homogeneous composition without the aid of any surface active agent in view that green coke is not swollen with water, is much more hydrophobic than graphite and is not easily wettable with water. For example, a homogeneous mixture of a finely pulverized green coke with 1–15% by weight of water could be obtained by grinding them in an automatic mortar for about one hour. If desired, however, a small amount of a surface active agent may be added, when the said admixing of a finely pulverized green coke with water may be carried out in any simple mixer such as kneader and a mixer with stirrer. With respect to the nature and amount of a surface active agent and its influence on the properties of carbon materials, we will explain later in relation to the wet grinding in which the use of a surface active agent as dispersant is more conventional. The monohydric alcohols may be admixed easily with a finely pulverized green coke in any simple mixer as above-mentioned.

The second process for the preparation of a molding composition is of so-called wet type and comprises wet-grinding a coarsely crushed green coke in water in the presence of a dispersant or in a monohydric alcohol containing at least 4 carbon atoms and being in liquid state at room temperatures to a desired fine particle size, filtering and drying the ground coke composition thus obtained to adjust the amount of water or monohydric alcohol contained therein to 1–15% by weight based on the weight of green coke.

The wet-grinding may be carried out in a known or conventional manner, typically by milling, for example in a vibration mill. This process will be practicable to the grinding in water, but not so advisable to that in a monohydric alcohol mainly for economical reasons.

Our experiments for examining possible influence of a dispersant on the self-sintering of green coke have shown that the presence of such a small amount as at most 0.2%, usually 0.10–0.15% by weight based on the weight of green coke of a surface active agent has no appreciable adverse effect on the properties of carbon materials derived therefrom such as apparent specific gravity and mechanical strength in compared with the absence of the same. Anionic, cationic and nonionic surface active agent may be used for this purpose, but the use of a nonionic one is preferred if an extreme high purity is required for the object carbon materials, because there is a possibility that the resulting carbon material is contaminated with such impurities as an alkali metal and sulfonic sulfur atoms for anionic agent and nitrogen atom and acid radical such as hydrochloric and hydrobromic acid redicals for cationic agent. We prefer to use a nonionic surface active agent having a HLB value of around 15, for example polyoxyethylene nonylphenol ether, in respect of its high ability of enhancing the miscibility of powdered green coke with water. It is a matter of course that the choice of an appropriate dispersant in any particular case is easily made by the skilled in the art, if necessary, by a simple experiment.

The third process for the preparation of a molding composition is of so-called semi-wet type and comprises grinding in an attritive manner a coarsely crushed green coke in the presence of 20–35% by weight based on the green coke of water or a monohydric alcohol containing at least 4 carbon atoms and being in the liquid state at room temperatures to a desired fine particle size and adjusting the amount of water or monohydric alcohol contained in the ground green coke composition thus formed to 1–15% by weight on the same basis.

The grinding in an attritive manner may be carried out in any grinding machine of attrition type as described with respect to the first alternative process.

In the third alternative process, the amount of water or monohydric alcohol to be present at the semi-wet grinding step is important for the smooth handling of the material with high efficiency. Thus, exceeding the upper limit, i.e. 35% by weight, there occurs an unacceptably noticeable adhesion of the material to be ground to the surface of functional parts, such as rollers, of grinding machine with which the material is in contact, whereas the presence of a smaller amount than the lower limit, i.e. 20% by weight, brings a violent scattering of the fine particles of the ground material which is more excessive than in cases of dry grinding. We particularly prefer the use of water or monohydric alcohol in an amount of 25-30% by weight for the semi-wet grinding.

In cases where water is used for the semi-wet grinding, a small amount of a surface active agent may be added, if desired, to make the wetting of green coke with water easier. Details of the surface active agent to be used are as described above in relation to the wet grinding.

After the completion of the grinding of a green coke in said semi-wet grinding step, the ground wet composition is treated usually by evaporation of an excess amount of water or monohydric alcohol to adjust the amount of the same to 1-15% by weight based on the green coke in the final composition. Alternatively, the adjustment of the amount of water or monohydric alcohol may be made by stopping the supply of water or monohydric alcohol at a later stage of the grinding.

The third alternative process is preferred to the first and second ones for the purpose of this invention both in technical and economical points of view.

Main advantage of the third alternative process over the first one, particularly in cases where water is used, is to make it possible to achieve an efficient attritive grinding of green coke simultaneously with intimate admixing of water with the green coke.

With respect to the comparison between the second alternative process and the third one, we have unexpectedly found that carbon materials derived from the molding compositions prepared by the latter process are significantly superior in their properties such as apparent specific gravity and mechanical strength to those from the compositions prepared by the former process. Thus, in one experiment, two molding compositions were tested, one of which was prepared according to the second alternative process by wet-grinding a petroleum green coke (a regular grade, volatile matter content of 14.1%) in water in the presence of a dispersant in a vibration mill for 5 hours followed by adjusting the amount of water to give a composition containing water in an amount of 5% by weight based on the green coke and having an average particle diameter of about $4\mu$ and another of which was prepared according to the third alternative process by grinding the same petroleum green coke as above in the presence of 30% by weight of water based on the green coke in an edge runner for 5 hours followed by adjusting the amount of water to give a composition containing water in an amount of 5% by weight on the same basis and having an average particle diameter of about $4\mu$. The each composition was molded by pressing in a mold having 3 cm diameter at 1000 Kg/cm$^2$ and the molded composition was then baked at 900° C. to give a sintered carbon material, a part of which was further heat-treated at about 3000° C. for graphitization thereof. The apparent specific gravity was determined on the respective sintered and graphitized carbon materials. The result is as follows:

Table 1

|  | Second alternative (wet) process | Third alternative (semi-wet) process |
| --- | --- | --- |
| Apparent specific gravity |  |  |
| 900° C. sintered material | 1.34 | 1.50 |
| 3000° C. graphitized material | 1.63 | 1.85 |

Observation by electron microscope of the two compositions before molding showed that the particle size is substantially equal between them, but shape of particles is appreciably different therebetween in that it is substantially or nearly spherical in the case of the third alternative process, whereas it is somewhat angular in the case of the second alternative process possibly due to rather strong impact component of the grinding force.

It is believed that the fine pulverization of a green coke to an average particle diameter of several microns or less can be effected relatively easily by the third alternative process because the grinding in an attritive manner is effective in order to wet uniformly the particles of green coke with water added in spite of highly hydrophobic nature of green coke and thus to increase the frictional force caused between particles, so that the attrition of coke particles caused not only by the rollers of grinder but also by rubbing contact between particles becomes higher and that the concentration of particles to be ground under the working surface of the rollers by a means for scraping up the particles is made easier.

The molding composition prepared by one of the three alternative processes above or by other appropriate processes, if any, may be molded by pressing in a mold, thus giving a molded green coke composition free from laminar cracks at the demolding step by extrusion. The molding and demolding may be carried out in a manner conventional in the art.

The baking of the molded green coke composition for sintering and the graphitization of the sintered carbon materials may be carried out in the same manner as those known and used conventionally in the art.

The process of this invention is applicable to the production of carbon materials from any kind of green coke from petroleum origin and coal pitch by molding by pressing in a mold a finely pulverized green coke as such followed by baking the molded green coke and applicable particularly advantageously to the production of large-sized carbon materials which are apt to cause almost inevitably laminar cracks in the molded green coke at the demolding step.

EXAMPLES OF THE INVENTION

The following examples further illustrate, but not limit, this invention.

EXAMPLE 1

A green petroleum coke of a quality equal to so-called premium or No. 1 grade commercially available or higher which was prepared by a delayed coking process and which has a volatile matter content of 8.15% and an ash content of 0.13% by weight was pulverized by dry grinding to an average particle diameter of about $6\mu$ and a particle size of less than $10\mu$. The green coke thus pulverized (200 g), as such or after mixing with an amount varying between 2 and 30 ml. of water in an automatic mortar for 1 hours, was each taken in a steel mold having 8.00 cm inside diameter and 10 cm height and having an abrasion-polished internal surface and pressed therein to 1000 Kg/cm$^2$ through a pushing rod having 7.98 cm diameter to obtain a molded green coke. The molded green coke obtained in each case was heated in an inert gas atmosphere at a rate of 30° C./hr to 900° C. and maintained at 900° C. for 3 hours to obtain a sintered carbon material.

Examination was made on the molded green coke and the sintered carbon material obtained in each case, the results of which are shown in Table 2.

Table 2

| Amount of water (% by weight based on the green coke) | 0 | 1 | 3 | 5 | 8 | 10 | 15 |
|---|---|---|---|---|---|---|---|
| Molded green coke | | | | | | | |
| Appearance (1) Laminar cracks / (2) Others | (1) Very considerable | (1) Somewhat decreased | (1) Trace only | (1) Nothing | (1) Nothing | (1) Nothing (2) Some water oozed | (2) A larger portion of the sample was pressed out of the mold |
| Apparent specific gravity | 1.18 | 1.18 | 1.19 | 1.20 | 1.21 | 1.20 | 1.18* |
| Sintered green coke | | | | | | | |
| Apparent specific gravity | 1.46 | 1.53 | 1.56 | 1.56 | 1.54 | 1.46 | 1.44* |
| Compressive strength (Kg/cm$^2$) | 1560–1720 | 1650–1780 | 1900–2100 | 2400–2600 | 1750–1900 | 1500–1600 | 1600–1650* |

*The value indicated is one determined on the sample remaining in the mold.

EXAMPLE 2

Experimental runs of Example 1 were repeated except that varying amounts of 2–30 g of octyl alcohol were used instead of those amounts of water. The results of examination are shown in Table 3.

Table 3

| Amount of octyl alcohol (% by weight based on the green coke) | 0 | 1 | 3 | 5 | 8 | 10 | 15 |
|---|---|---|---|---|---|---|---|
| Molded green coke | | | | | | | |
| Appearance (1) Laminar cracks / (2) Others | (1) Very considerable | (1) Somewhat decreased | (1) Trace only | (1) Nothing | (1) Nothing | (1) Nothing (2) Some alcohol oozed | (2) A larger portion of the sample was pressed out of the mold |
| Apparent specific gravity | 1.18 | 1.18 | 1.19 | 1.21 | 1.20 | 1.20 | 1.17* |
| Sintered carbon material | | | | | | | |
| Apparent specific gravity | 1.46 | 1.52 | 1.55 | 1.56 | 1.55 | 1.48 | 1.42* |
| Compressive strength (kg/cm$^2$) | 1720 | 1750 | 2050 | 2650 | 2000 | 1850 | 1680* |

*The value indicated is one determined on the sample remaining in the mold.

EXAMPLE 3

A green pitch coke having a volatile matter content of 9.41% and an ash content of 0.13% by weight which was prepared by a delayed coking process was pulverized by dry grinding to a particle size of less than 10μ. The green coke thus pulverized (200 g) was intimately admixed with 6% by weight of water in an automatic mortar for 1 hour and the resulting composition was molded in the same mold and under the same conditions as those used in Example 1, yielding a molded green coke free from laminar cracks. The molded green coke was sintered in the same manner as that in Example 1 to obtain a sintered carbon material having an apparent specific gravity of 1.57 and a compressive strength of 2300–2450 Kg/cm$^2$. The sintered carbon material was further heat treated at a temperature of around 3000° C. for graphitization. The graphitized carbon material thus obtained had an apparent specific gravity of 1.82 and a compressive strength of 920 Kg/cm$^2$.

EXAMPLE 4

The same green petroleum coke as used in Example 1 was first crushed to give a coarse powder passing completely through 150 mesh Tyler sieve. To 3 Kg of the coarse powder thus obtained was added 9 l. of 0.05% aqueous solution of polyoxyethylene nonylphenol ether having a HLB value of 15 and the resulting mixture was treated in a vibration mill for 30 hours to obtain an average particle diameter of less than 6μ. The pulverized mixture was filtered and dehydrated and the resulting mass was sun-dried for one day and further dried in a vacuum drier at 120° C. for 5 hours to obtain a finely pulverized green coke composition containing 7.3% of water based on the green coke. The composition (200 g) was taken in a steel mold same as that used in Example 1 and molded under the same conditions as used in Example 1 to obtain a molded green coke free from laminar cracks. The molded green coke thus obtained was sintered and then graphitized in the same manner as that, respectively, in Example 1 and Example 3. The apparent specific gravity and compressive strength of the sintered carbon material were 1.56 and 2450–2600 Kg/cm$^2$, respectively, and those of the graphitized one were 1.81 and 850 Kg/cm$^2$, respectively.

EXAMPLE 5

The finely pulverized green coke composition containing 7.3% of water based on the green coke obtained in Example 4 was further kneaded with 7.7% of water on the same basis in an automatic mortar and the resulting composition was molded in the same manner as that in Example 4. During the molding, a part of the sample was pressed out from the mold and some water oozed simultaneously, but the resulting molded green coke was free from laminar cracks. The molded green coke was sintered in the same manner as that in the preceding Examples to give a sintered carbon material having an apparent specific gravity of 1.42 and a compressive strength of 1200–1350 Kg/cm².

EXAMPLE 6

A green petroleum coke (15 Kg) of a quality equal to so-called regular grade having a volatile matter content of 12.3% by weight which has been coarsely crushed to about 20–30 Tyler mesh size was taken in an edge runner provided with a pan having 1.6 m diameter and with two rollers each weighing about 1 ton and rotating at 18 rpm. The green coke was pulverized therein, as such or after adding thereto an amount varying between 10 and 40% by weight based on the green coke of water, while determining the content of water at intervals of 30 minutes and supplying, if necessary, an amount of water corresponding to that evaporated to maintain the water content at the initial level within fluctuations of ±2% during the pulverization operation.

In cases where the amount of water was 0, 10 and 15% by weight, the scattering of fine particles of pulverized green coke was brought about seriously and a further difficulty was encountered in concentrating the material to be ground under the working surface of rollers, these tendencies being more remarkable in the cases of the presence of 10 and 15% by weight of water rather than the case of the absence of water. In contrast with these cases, the presence of 20% by weight of water was found to serve a considerable decrease in the extent of scattering and to make easier the concentration of the material to be ground under the working surface of rollers. These situations were much more improved in cases where the amount of water was 25 and 30%, that is the scattering of fine particles was substantially prevented, the concentration of material was easily made and the material was ground by attrition in the form of thin layer. With 35% of water, there was observed the adhesion of some material to be ground to the surface of rollers with which the material was in contact. In the case of the presence of 40% of water, the amount of material adhered to said surface was very large, which was spattered out of the pan, thus making the continuation of grinding difficult or impossible.

The relations between the amount of water and average particle diameter or particle size and between the former and the yield of the pulverized green coke (the amount of the coke itself excluding the content of water) after the grinding over 5 hours in each case are shown in Table 4.

Table 4

| Amount of water *1 added (%) | 0 | 10 | 15 | 20 | 25 | 30 | 35 | 40 |
|---|---|---|---|---|---|---|---|---|
| Average particle diameter (μ) | 8.5 | 9.1 | 8.3 | 6.1 | 4.3 | 4.1 | 4.4 | *3 |
| Particle size (μ) | Less than 30 | Less than 35 | Less than 30 | Less than 15 | Less than 9 | Less than 9 | Less than 9 | *3 |
| Yield of pulverized green coke (Kg) *2 | 12.3 | 11.5 | 12.0 | 13.7 | 14.7 | 14.8 | 13.8 | *3 |

*1% by weight based on the green coke
*2 Amount of green coke charged was 15 Kg
*3 The adhesion of material ground or to be ground to the rollers was very considerable and the material adhered was spattered out of the pan, so that the continuation of the operation became impossible.

The finely pulverized green coke composition obtained from the grinding for 5 hours with 30% of water was dried to adjust the amount of water to an amount varying between 1–15% by weight based on the green coke. The composition thus obtained (25 g) was taken in a steel mold having 3 cm diameter and molded by pressing at 1000 Kg/cm². The molded composition in each case was baked at 900° C. to obtain a sintered carbon material which was then graphitized at a temperature of about 3000° C. The results of examination and determination are shown in Table 5.

Table 5

| Amount of water (%)*1 | | 1 | 3 | 5 | 8 | 10 | 15 |
|---|---|---|---|---|---|---|---|
| Molded green coke Appearance | (1) Laminar cracks (2) Others | (1) A little was found | (1) Trace only | (1) Nothing | (1) Nothing | (1) Nothing (2) Some water oozed | (2) A larger portion of the sample was pressed out of the mold |
| Apparent specific gravity | | | | | | | |
| Molded green coke | | 1.18 | 1.19 | 1.20 | 1.21 | 1.20 | 1.18*2 |
| Sintered carbon material (900° C.) | | 1.49 | 1.50 | 1.50 | 1.51 | 1.48 | 1.46 |
| Sintered carbon material (900° C.) Graphitized carbon material | | 1.79 | 1.82 | 1.81 | 1.83 | 1.78 | 1.77 |

*1% by weight based on the green coke
*2The value indicated is one determined on the sample remaining in the mold.

In a further test, the finely pulverized green coke (25 g) derived from dry-grinding, i.e. in the absence of water added was molded by pressing in a steel mold at 1000 Kg/cm² as similar as above. It was observed that laminar cracks caused in the molded green coke at the demolding the same were so excessive as to make the molding practically impossible.

EXAMPLE 7

A green pitch coke (15 kg) having a volatile matter content of 9.41% by weight which has been coarsely crushed to about 20–30 Tyler mesh size was taken in an edge runner same as that used in Example 6 and pulverized therein after adding an amount varying between 20 and 35% by weight of octyl alcohol based on the green coke. During the pulverizing operation, the content of octyl alcohol was monitored at constant intervals, at which an amount of octyl alcohol was supplied, if necessary, to maintain the alcohol content at the initial level within fluctuations of ±2% throughout the operation.

With 20% by weight of octyl alcohol, some appreciable scattering of fine particles was observed. In cases where the amount of alcohol was 25% and 30% by weight, the pulverization was satisfactorily carried out with little or no scattering of fine particles and with easy concentration of the material to be ground under the working surface of rollers. With 35% by weight of alcohol, there was observed the adhesion of some material to be ground to the surface of rollers, so that smooth handling was somewhat hindered.

After the grinding in the presence of 25 and 30% by weight of octyl alcohol was continued for 5 hours, the green coke thus pulverized had an average particle diameter of $3.9\mu$ and $4.0\mu$, respectively and a particle size of less than $9\mu$ in both cases.

The finely pulverized green coke composition obtained from the grinding in the presence of 25% by weight of octyl alcohol was dried to adjust the amount of alcohol to 1-15% by weight. Each of the green coke composition thus obtained (25 g) was molded in the same mold and in the same manner as those used in Example 6. With respect to laminar cracks in the molded green coke composition, nothing was observed in cases where the amount of alcohol was 3-8% by weight, whereas some laminar cracks were observed in case of 1% by weight of alcohol. With 10% by weight of alcohol, there was observed oozing of some alcohol and with 15% by weight of alcohol, a larger portion of the composition was pressed out of the mold.

The molded green coke compositions with 3-8% by weight of octyl alcohol thus obtained were sintered at 900° C. and the sintered materials thus obtained were graphitized at about 3000° C. The Apparent specific gravity of the sintered carbon materials was 1.47-1.52 and that of the graphitized ones was 1.78-1.84.

EXAMPLE 8

A green petroleum coke (15 Kg) having a volatile matter content of 14.1% by weight which has been coarsely crushed to pass completely through 150 mesh Tyler sieve was taken in an edge runner same as that used in Example 6 and pulverized therein with the addition of 28% by weight of n-butyl alcohol and benzyl alcohol, respectively. During the pulverizing operation, an amount of the same alcohol was supplied, as required, to maintain the alcohol content at the initial level within fluctuations of ±2%. The operation was continued for 5 hours, during which no appreciable scattering of fine particles occurred and the material was in a layer form under the roller with easy concentration of the material thereunder. The finely pulverized green coke composition thus obtained had an average particle diameter of $4.1\mu$ and a particle size of less than $9\mu$ in both cases. The composition was dried to adjust the amount of alcohol to 5% by weight based on the green coke and the dried composition (25 g) was molded in the same mold and in the same manner as those used in Example 6, thus giving the molded composition free from laminar cracks. Subsequent sintering and graphitizing were carried out as similar as in Example 6. Apparent specific gravity of the molded green coke, sintered carbon material and graphitized one in each case was determined, the results of which are shown in Table 6.

Table 6

|  | n-Butyl alcohol | Benzyl alcohol |
|---|---|---|
| Apparent specific gravity |  |  |
| Molded green coke | 1.19 | 1.21 |
| Sintered carbon material | 1.49 | 1.52 |
| Graphitized carbon material | 1.81 | 1.83 |

What we claim is:

1. A process for the production of a high-density carbon material from a green coke comprising the steps of (a) molding by pressing in a mold a finely pulverized green coke, by itself without the aid of a binder, (b) demolding the molded green coke (c) baking the molded green coke at a sintering temperature to form a sintered carbon material, characterized in that the green coke to be molded is used in the form of a composition comprising a finely pulverized green coke in intimate admixture with 1-15% by weight based on the weight of the green coke of incorporated water or an incorporated monohydric alcohol selected from the group consisting of an alkanol containing 4-8 carbon atoms and benzyl alcohol, whereby to prevent or reduce laminar cracks caused in the molded green coke at the demolding step.

2. A process as claimed in claim 1 wherein the amount of water or monohydric alcohol contained in the composition is 3-8% by weight on the same basis.

3. A process as claimed in claim 1 wherein the finely pulverized green coke has an average particle diameter of less than $6\mu$ and a particle size of less than $10\mu$.

4. A process as claimed in claim 1 wherein the green coke is a coal pitch coke having a volatile matter content of 7-10%, preferably 8-10% by weight.

5. A process as claimed in claim 1 wherein the green coke is a petroleum coke of premium grade having a volatile matter content of 7-10%, preferably 8-10% by weight.

6. A process as claimed in claim 1 wherein the green coke is a petroleum coke of regular grade or lower having a volatile matter content of 8-20%, preferably 10-16% by weight.

7. A process as claimed in claim 1 wherein the green coke composition to be molded is prepared by providing a finely pulverized green coke previously prepared, adding thereto 1-15% by weight of water of an alcohol selected from the group consisting of an alkanol containing 4-8 carbon atoms and benzyl alcohol and intimately admixing them until a homogenous mixture is obtained.

8. A process as claimed in claim 1 wherein the green coke composition to be molded is prepared by wet-grinding a coarsely crushed green coke in water in the presence of a dispersant or in an alcohol to a desired fine particle size, said alcohol being selected from the group consisting of an alkanol containing 4-8 carbon atoms and benzyl alcohol, filtering and drying the ground coke composition thus obtained to adjust the amount of water or monohydric alcohol contained therein to 1-15% by weight based on the weight of green coke.

9. A process as claimed in claim 1 wherein the green coke composition to be molded is prepared by grinding in an attritive manner a coarsely crushed green coke in the presence of 20-35% by weight based on the green coke of water or a monohydric alcohol containing at least 4 carbon atoms and being in the liquid state at room temperatures to a desired fine particle size and adjusting the amount of water or monohydric alcohol contained in the ground green coke composition thus formed to 1-15% by weight on the same basis.

10. A process as claimed in claim 9 wherein the amount of water or monohydric alcohol during the grinding is 25-30% by weight based on the green coke.

11. A process as claimed in claim 1 which further comprises a step of graphitizing the sintered carbon material from the baking step to produce a graphitized carbon material.

* * * * *